US007486677B1

(12) United States Patent
Au

(10) Patent No.: US 7,486,677 B1
(45) Date of Patent: Feb. 3, 2009

(54) TECHNIQUE FOR PROVIDING INTER-NODAL COMMUNICATIONS IN A PHOTONICS NETWORK

(75) Inventor: How Kee Au, Ottawa (CA)

(73) Assignee: Nortel Networks Limited, St. Laurent, Quebec (CA)

(*) Notice: Subject to any disclaimer, the term of this patent is extended or adjusted under 35 U.S.C. 154(b) by 1198 days.

(21) Appl. No.: 10/143,889

(22) Filed: May 14, 2002

(51) Int. Cl.
*H04L 12/28* (2006.01)
*H04L 12/56* (2006.01)
*H04J 14/00* (2006.01)

(52) U.S. Cl. ............... 370/392; 398/46; 398/49; 398/51

(58) Field of Classification Search ........... 370/389, 370/392; 398/45, 49–51
See application file for complete search history.

(56) References Cited

U.S. PATENT DOCUMENTS

| | | | | |
|---|---|---|---|---|
| 6,233,221 | B1* | 5/2001 | Lowe et al. ............... 370/222 |
| 6,515,789 | B1* | 2/2003 | Morgan ................. 359/280 |
| 6,826,368 | B1* | 11/2004 | Koren et al. .............. 398/50 |
| 6,947,424 | B2* | 9/2005 | Beshai et al. ............. 370/392 |
| 6,959,151 | B1* | 10/2005 | Cotter et al. ............. 398/54 |
| 6,983,109 | B1* | 1/2006 | Britz et al. .............. 398/51 |
| 7,043,225 | B1* | 5/2006 | Patel et al. .............. 455/405 |
| 7,072,337 | B1* | 7/2006 | Arutyunov et al. ......... 370/389 |
| 7,085,784 | B2* | 8/2006 | Krishna et al. ........... 707/204 |
| 7,120,154 | B2* | 10/2006 | Bavant et al. ........... 370/395.53 |
| 2002/0063924 | A1* | 5/2002 | Kimbrough et al. ........ 359/125 |

* cited by examiner

*Primary Examiner*—Ronald Abelson
(74) *Attorney, Agent, or Firm*—Hunton & Williams LLP

(57) ABSTRACT

A technique for providing inter-nodal communications in a photonics network is disclosed. In one exemplary embodiment, the technique may be realized by as a method for providing inter-nodal communications in a photonics network having a plurality of network nodes each having a unique network address. Such a method may comprise receiving a dedicated inter-nodal communications optical signal at a first of the plurality of network nodes, wherein the received dedicated inter-nodal communications optical signal includes a destination network address. The method may also comprise forwarding the received dedicated inter-nodal communications optical signal to a second of the plurality of network nodes if the destination network address does not match the unique network address of the first network node. The method may further comprise processing the received dedicated inter-nodal communications optical signal at the first network node if the destination network address matches the unique network address of the first network node, wherein the received dedicated inter-nodal communications optical signal is processed by extracting any one of audio, video, and data information from the received dedicated inter-nodal communications optical signal for use at the first network node.

20 Claims, 5 Drawing Sheets

TECHNIQUE FOR PROVIDING INTER-NODAL COMMUNICATIONS IN A PHOTONICS NETWORK

FIELD OF THE INVENTION

The present invention relates generally to inter-nodal network communications and, more particularly, to a technique for providing inter-nodal communications in a photonics network.

BACKGROUND OF THE INVENTION

In the traditional Public Switched Telephone Network (PSTN), network elements are typically equipped with order wire (OW) electronics for supporting voice communications between such network elements. For example, referring to FIG. 1, there is shown a portion of the PSTN 10 comprising a plurality of network elements 12 interconnected by an electrical OW 14. Each network element 12 maintains OW interface electronics 16 for supporting voice communications with other network elements 12 over the electrical OW 14.

The above-described OW system is typically used by PSTN installation and maintenance personnel. For example, PSTN maintenance personnel may use the above-described OW system to communicate between network elements within a same network site or at different network sites for localizing and repairing failures in the PSTN, or during coordinated maintenance activities such as, for example, provisioning and testing of new services.

Since the traditional PSTN is an electrical-based system, it is relatively straightforward to implement the above-described electrical-based OW system therein. It is also relatively straightforward to implement an OW system in a next generation synchronous optical network (SONET), despite the fact that a SONET system is a combined optical- and electrical-based system. That is, each network element in a SONET network supports optical-to-electrical (O/E) and electrical-to-optical (E/O) conversion functions. Thus, voice communications may be carried between network elements via an OW system in a SONET network using these O/E and E/O conversion functions. In fact, the benefits of an OW system in a SONET network are so great that the standards governing SONET networks mandate the use of an OW system. Specifically, the SONET standards requirements for such an OW system in a SONET network are to embed a narrow band channel (64 kilobits per second (kbps)) in a SONET overhead for carrying voice communications between network elements. These requirements were drafted to insure support for legacy systems, which only contemplated voice communications for the OW system. Indeed, because of its relatively slow transmission rate, the narrow band channel defined in the SONET standards only permits voice communications. However, to more efficiently perform installation and maintenance activities at network sites, it would be desirable to transmit data and video communications in addition to voice communications.

In a latest generation photonics network, there are no O/E and E/O conversion functions in network elements. An optical signal is generated from a first node outside the photonics network and, after passing through the photonics network, the optical signal is terminated at a second node outside the photonics network. Network elements in the photonics network optically route the optical signal through the photonics network without any O/E or E/O conversions. As there is no electrical connectivity between network elements, there is also no means of supporting voice communications. Thus, installation and maintenance personnel performing installation and maintenance activities at network sites in a photonics network must rely on cell phones and/or the traditional PSTN for voice communications in order to coordinate their tasks.

In view of the foregoing, it would be desirable to provide a technique for providing inter-nodal communications in a photonics network to overcome the above-described inadequacies and shortcomings. Indeed, as telecommunications technology has evolved into the photonic domain, there is a need to provide inter-nodal communications capabilities in this photonic domain. Furthermore, as discussed above, to more efficiently perform installation and maintenance activities at network sites, it would also be desirable to introduce new functions in photonics network elements so as to enable them to support data and video communications in addition to voice communications.

SUMMARY OF THE INVENTION

According to the present invention, a technique for providing inter-nodal communications in a photonics network is provided. In one exemplary embodiment, the technique may be realized by as a method for providing inter-nodal communications in a photonics network having a plurality of network nodes each having a unique network address. Such a method may comprise receiving a dedicated inter-nodal communications optical signal at a first of the plurality of network nodes, wherein the received dedicated inter-nodal communications optical signal includes a destination network address. The method may also comprise forwarding the received dedicated inter-nodal communications optical signal to a second of the plurality of network nodes if the destination network address does not match the unique network address of the first network node. The method may further comprise processing the received dedicated inter-nodal communications optical signal at the first network node if the destination network address matches the unique network address of the first network node, wherein the received dedicated inter-nodal communications optical signal is processed by extracting any one of audio, video, and data information from the received dedicated inter-nodal communications optical signal for use at the first network node.

In accordance with other aspects of this exemplary embodiment of the present invention, receiving the dedicated inter-nodal communications optical signal at a first of the plurality of network nodes may beneficially include demultiplexing a multiplexed optical signal including the dedicated inter-nodal communications optical signal.

In accordance with further aspects of this exemplary embodiment of the present invention, the method may also beneficially comprise converting the received dedicated inter-nodal communications optical signal into a received dedicated inter-nodal communications electrical signal. If such is the case, the method may further beneficially comprise directing the received dedicated inter-nodal communications electrical signal into at least one incoming IP packet buffer. Thus, if the destination network address is an IP destination network address, forwarding the received dedicated inter-nodal communications optical signal to a second of the plurality of network nodes may beneficially include routing the received dedicated inter-nodal communications electrical signal based upon the IP destination network address. Alternatively, processing the received dedicated inter-nodal communications optical signal at the first network node may beneficially include formatting the extracted information into one of an audio, video, and data output format.

In accordance with still further aspects of this exemplary embodiment of the present invention, the method may also beneficially comprise receiving any one of audio, video, and data information in an electrical form. This received electrical information may beneficially be formatted. If such is the case, the method may further beneficially comprise packetizing the formatted received electrical information into at least one electrical IP packet, wherein each electrical IP packet has a respective IP destination network address. Then, the method may further beneficially comprise routing each electrical IP packet based upon each respective IP destination network address. The method may then still further beneficially comprise converting each electrical IP packet into a converted dedicated inter-nodal communications optical signal. The method may then additionally beneficially comprise multiplexing the converted dedicated inter-nodal communications optical signal with other optical signals.

In another exemplary embodiment, the technique may be realized by as an apparatus for supporting inter-nodal communications in an optical network having a plurality of network nodes each having a unique network address. Such an apparatus may comprise an optical-to-electrical converter for converting a received dedicated inter-nodal communications optical signal into a received converted dedicated inter-nodal communications electrical signal, wherein the received converted dedicated inter-nodal communications electrical signal includes a destination network address. The apparatus may also comprise an electrical router for routing the received converted dedicated inter-nodal communications electrical signal based upon the destination network address. The apparatus may further comprise an extraction unit for extracting any one of audio, video, and data information from the received converted dedicated inter-nodal communications electrical signal if the electrical router routes the received converted dedicated inter-nodal communications electrical signal to a local network node. The apparatus may still further comprise an electrical-to-optical converter for converting the received converted dedicated inter-nodal communications electrical signal into a forwarded dedicated inter-nodal communications optical signal if the electrical router routes the received converted dedicated inter-nodal communications electrical signal to another network node.

In accordance with other aspects of this exemplary embodiment of the present invention, the apparatus may beneficially comprise a demultiplexer for demultiplexing a multiplexed optical signals including the received dedicated inter-nodal communications optical signal.

In accordance with further aspects of this exemplary embodiment of the present invention, the apparatus may beneficially comprise an output adaptation unit for formatting the extracted information into one of an audio, video, and data output format.

In accordance with still further aspects of this exemplary embodiment of the present invention, the apparatus may beneficially comprise an input adaptation unit for receiving any one of audio, video, and data information in an electrical form. If such is the case, the apparatus may also beneficially comprise a packetization unit for packetizing the received electrical information into at least one electrical IP packet, wherein each electrical IP packet has a respective IP destination network address. The electrical router may then beneficially route each packetized electrical signal based upon each respective IP destination network address. The apparatus may further beneficially comprise a plurality of IP packet buffers for storing each packetized electrical signal and the received converted dedicated inter-nodal communications electrical signal.

In accordance with additional aspects of this exemplary embodiment of the present invention, the apparatus may beneficially comprise a multiplexer for multiplexing the forwarded dedicated inter-nodal communications optical signal with other optical signals.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

Figure 1:
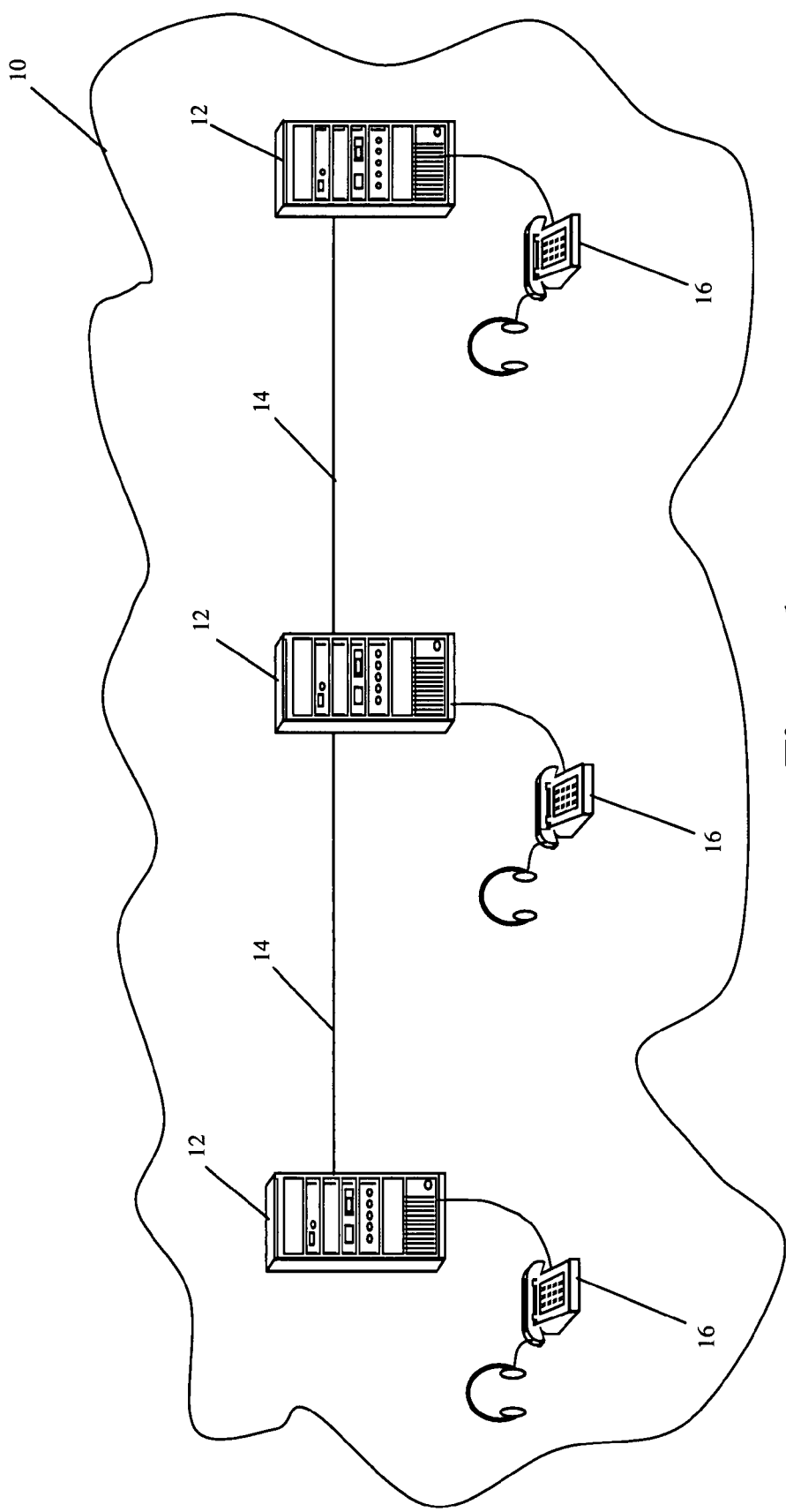
FIG. 1 shows a portion of the Public Switched Telephone Network having a plurality of network elements interconnected by an electrical order wire.
Figure 2:
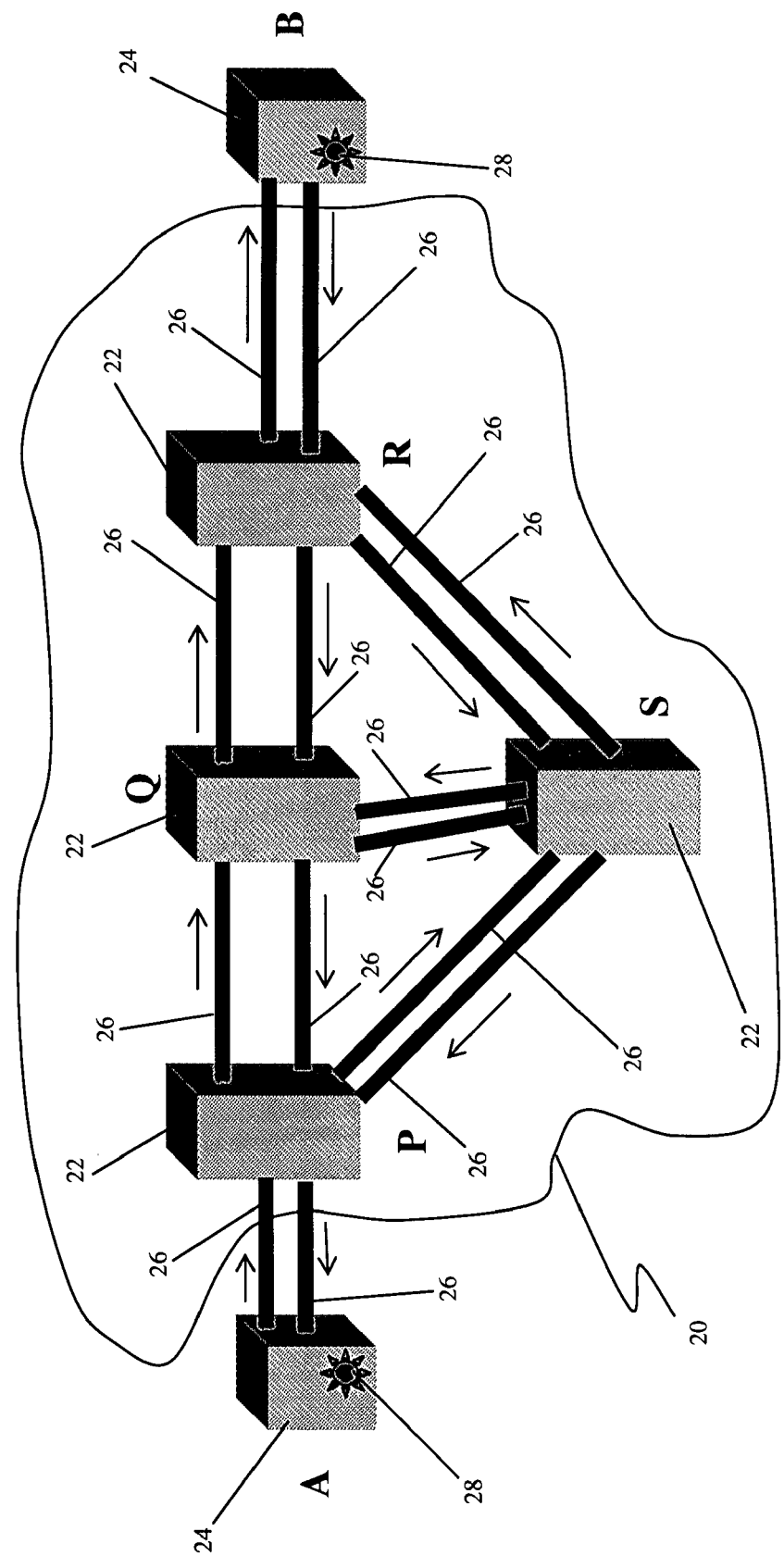
FIG. 2 shows a typical photonics network having a plurality of photonics nodes, a plurality of peripheral nodes, and a plurality of optical fibers for interconnecting the plurality of photonics nodes and the plurality of peripheral nodes.

Referring to FIG. 2, there is shown a typical photonics network 20 comprising a plurality of photonics nodes (P, Q, R, and S) 22, a plurality of peripheral nodes (A and B) 24, and a plurality of optical fibers 26 for interconnecting the plurality of photonics nodes 22 and the plurality of peripheral nodes 24. Each of the peripheral nodes 24 comprises at least one light source 28 for transmitting optical signals from an output port thereof over a respective one of the plurality of optical fibers 26 to an input port of a respective one of the plurality of photonics nodes 22. Each of the peripheral nodes 24 also receives optical signals at an input port thereof over a respective one of the plurality of optical fibers 26 from an output port of a respective one of the plurality of photonics nodes 22. Each of the plurality of photonics nodes 22 operates to direct optical signals received at an input port thereof over a respective one of the plurality of optical fibers 26 to an output port thereof for transmission on another respective one of the plurality of optical fibers 26.

At this point it should be noted that each of the plurality of optical fibers 26 can typically simultaneously carry N optical signals, each traveling at a respective optical wavelength. That is, each of the plurality of optical fibers 26 typically carries N optical signals that have been wavelength division multiplexed (WDM) by either one of the plurality of photonics nodes 22 or one of the plurality of peripheral nodes 24. A WDM optical signal being carried by one of the plurality of optical fibers 26 is typically eventually wavelength division demultiplexed (WDD) by one of the plurality of photonics nodes 22 or one of the plurality of peripheral nodes 24, whichever receives the WDM optical signal.

Figure 3:
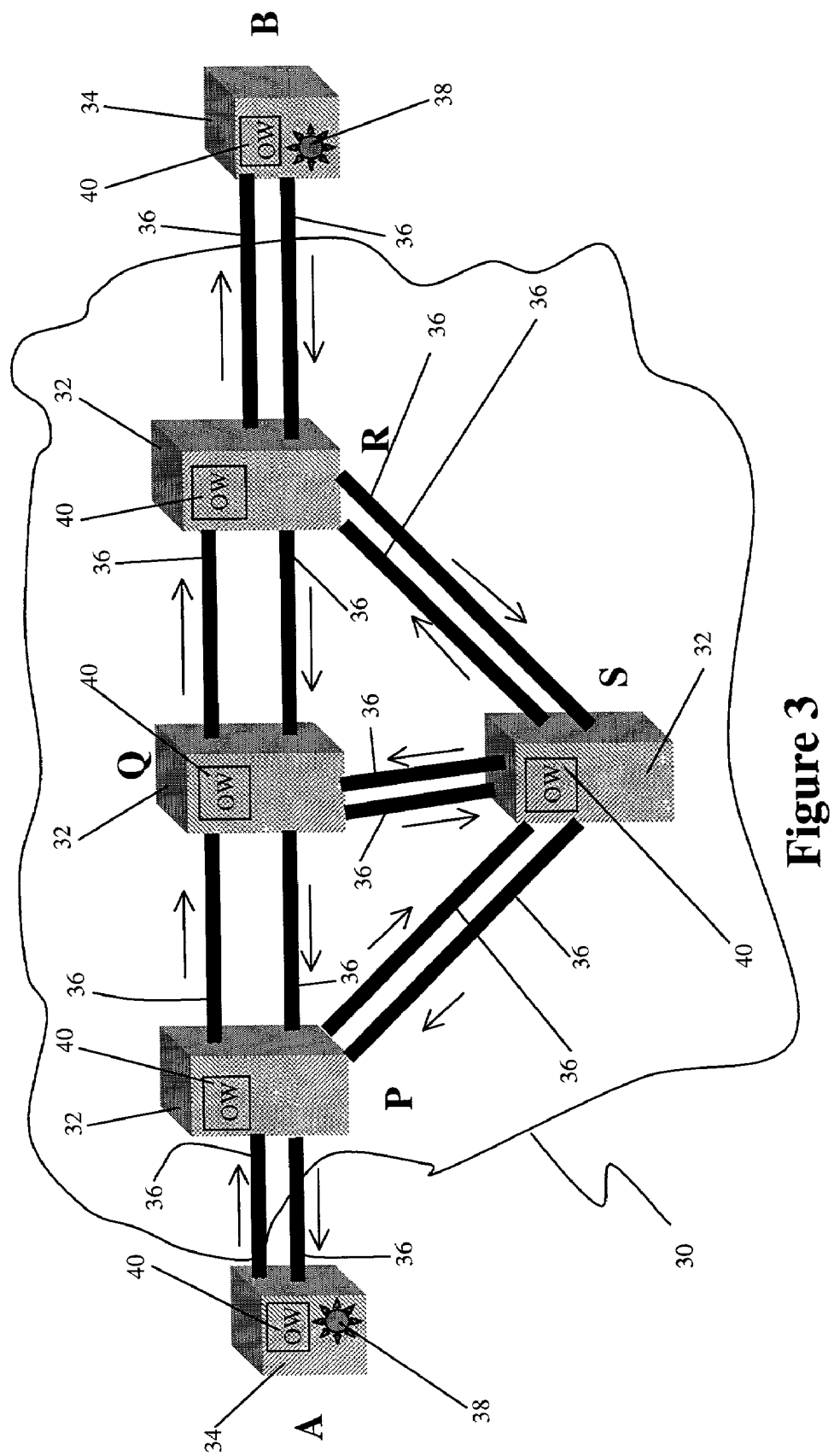
FIG. 3 shows a photonics network having a plurality of photonics nodes with order wire units in accordance with the present invention.

Referring to FIG. 3, there is shown a photonics network 30 in accordance with the present invention. The network 30 comprises a plurality of photonics nodes (P, Q, R, and S) 32, a plurality of peripheral nodes (A and B) 34, and a plurality of optical fibers 36 for interconnecting the plurality of photonics nodes 32 and the plurality of peripheral nodes 34. Similar to the peripheral nodes 24 in the network 20 described above, each of the peripheral nodes 34 in the network 30 comprises at least one light source 38 for transmitting optical signals from an output port thereof over a respective one of the plurality of optical fibers 36 to an input port of a respective one of the plurality of photonics nodes 32. Each of the peripheral nodes 34 also receives optical signals at an input port thereof over a respective one of the plurality of optical fibers 36 from an output port of a respective one of the plurality of photonics nodes 32. Each of the plurality of photonics nodes 32 operates to direct optical signals received at an input port thereof over a respective one of the plurality of optical fibers 36 to an output port thereof for transmission on another respective one of the plurality of optical fibers 36.

However, each of the plurality of photonics nodes 32 and each of the peripheral nodes 34 also comprises an order wire unit 40 for supporting inter-nodal network communications in accordance with the present invention. Each order wire unit 40 operates to transmit/receive a dedicated order wire communications optical signal over respective ones of the plurality of optical fibers 36. This dedicated order wire communications optical signal travels at a dedicated optical wavelength that may be outside a band of optical wavelengths that are dedicated to data transport, or inside the band of optical wavelengths that are dedicated to data transport but instead used for inter-nodal network communications in accordance with the present invention. For example, the optical wavelength of the dedicated order wire communications optical signal may be 1510 nm, and the dedicated order wire communications optical signal may operate with a bandwidth of 100 Mbps or higher.

Figure 4:
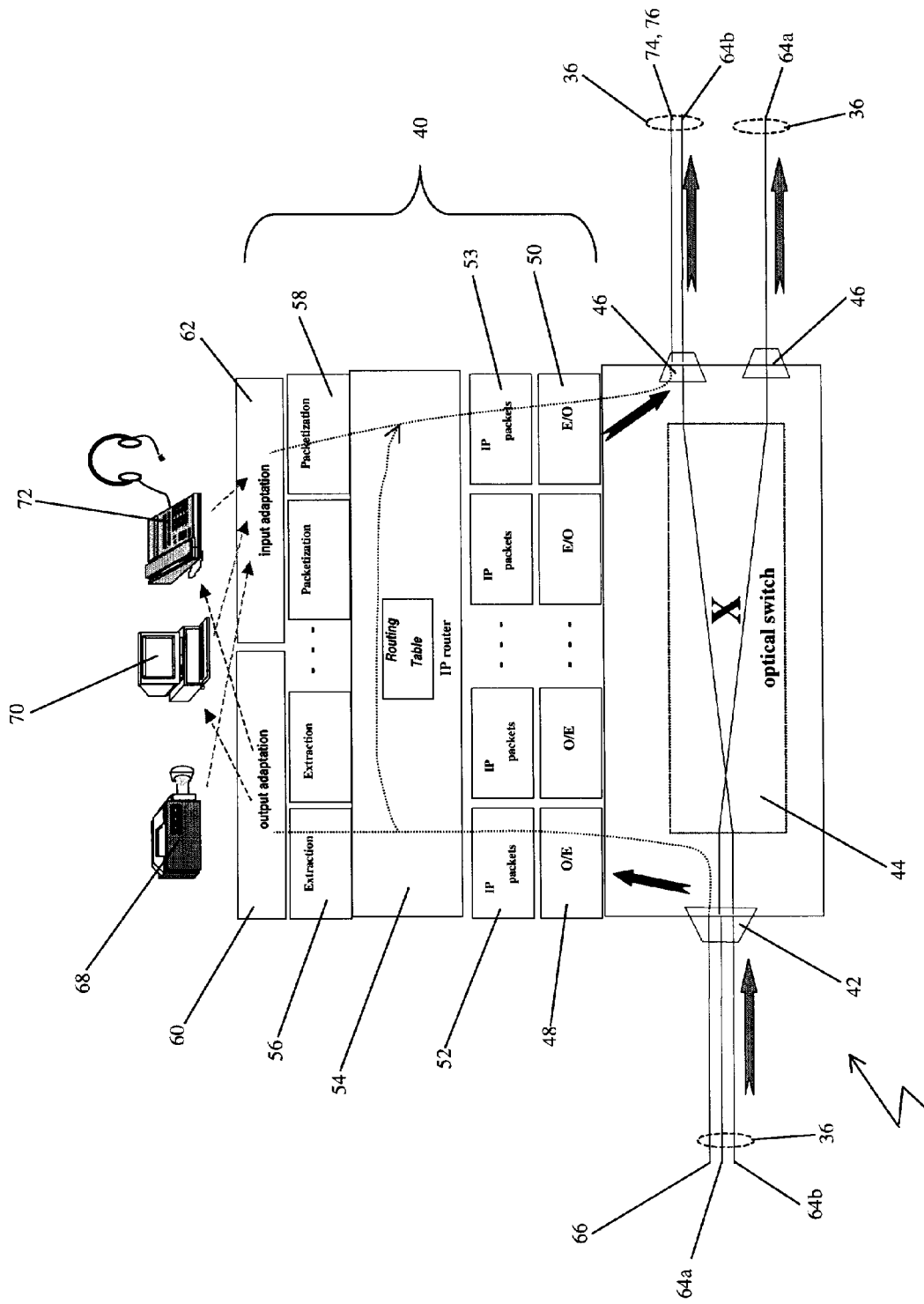
FIG. 4 shows a more detailed view of one of the plurality of photonics nodes shown in FIG. 3 containing an order wire unit in accordance with the present invention.

Referring to FIG. 4, there is shown a more detailed view of one of the plurality of photonics nodes 32 shown in FIG. 3 containing an order wire unit 40. As shown in FIG. 4, the photonics node 32 comprises a demultiplexer 42, an optical switch 44, a plurality of multiplexers 46, a plurality of optical-to-electrical converters (O/E) 48, a plurality of electrical-to-optical converters (E/O) 50, a plurality of incoming Internet Protocol (IP) packet buffers 52, a plurality of outgoing IP packet buffers 53, an IP router 54 having a routing table, a plurality of extraction components 56, a plurality of packetization components 58, an output adaptation component 60, and an input adaptation component 62.

The photonics node 32 receives regular data transport optical signals 64 and a dedicated order wire communications optical signal 66 over one of the plurality of optical fibers 36. These regular data transport optical signals 64 and the dedicated order wire communications optical signal 66 are wavelength division multiplexed (WDM) prior to being transmitted on the optical fiber 36. The demultiplexer 42 separates each of the regular data transport optical signals 64 and the dedicated order wire communications optical signal 66 in the received WDM optical signal. The regular data transport optical signals 64 are directed to the optical switch 44, which routes the regular data transport optical signals 64, according to any number of optical switching protocols, to the plurality of multiplexers 46 for possible combining with other optical signals for transmission over respective ones of the plurality of optical fibers 36 to other photonics node 32 in the network 30.

The dedicated order wire communications optical signal 66, on the other hand, is first directed to one of the plurality of optical-to-electrical converters (O/E) 48 for conversion from its optical format into an electrical format. The resulting dedicated order wire communications electrical signal is then directed to one of the plurality of incoming IP packet buffers 52 where it is separated into IP packets that are queued for the IP router 54. Based upon the contents of its routing table, the IP router 54 determines whether the IP packets of the dedicated order wire communications electrical signal are destined for this particular photonics node 32, or another photonics node 32 in the network 30. It should be noted that the IP router 54 operates using known IP routing techniques, which typically look at a header of an IP packet to determine a source and a destination associated with the IP packet.

If the IP router 54 determines that the IP packets of the dedicated order wire communications electrical signal are destined for another photonics node 32 in the network 30, then the IP packets of the dedicated order wire communications electrical signal are directed to one of the plurality of outgoing IP packet buffers 53 where they are formatted and queued for one of the plurality of electrical-to-optical converters (E/O) 50. The electrical-to-optical converter (E/O) 50 converts the formatted IP packets of the dedicated order wire communications electrical signal from their electrical format into an optical format and then directs a resulting dedicated order wire communications optical signal 74 to the plurality of multiplexers 46 for possible combining with other optical signals for transmission over respective ones of the plurality of optical fibers 36. More specifically, the resulting dedicated order wire communications optical signal 74 is directed to the appropriate multiplexer 46 and optical fiber 36 which the IP router 54 has determined would allow the dedicated order wire communications optical signal 74 to reach its destined photonics node 32 in the network 30.

If, on the other hand, the IP router 54 determines that the IP packets of the dedicated order wire communications electrical signal are destined for this particular photonics node 32, then the IP packets of the dedicated order wire communications electrical signal are directed to one of the plurality of extraction components 56 for extracting information from the IP packets of the dedicated order wire communications electrical signal. The extracted information is directed to the output adaptation component 60 for formatting into an appropriate output format. For example, the extracted information may be formatted for video and data 70, and/or audio 72 usage.

The photonics node 32 may also accept information from various input sources for transmission to other photonics node(s) 32 in the network 30. That is, information from video 68, data 70, and/or audio 72 sources may be received by the input adaptation component 62, which formats the information and directs the formatted information to one of the plurality of packetization components 58. The packetization component 58 separates the formatted information into IP packets, and directs the IP packets, which make up a dedicated order wire communications electrical signal, to the IP router 54. Based upon the contents of its routing table, the IP router 54 determines a route for the IP packets of the dedicated order wire communications electrical signal to take to reach the other photonics node(s) 32 in the network 30. The IP router then directs the IP packets of the dedicated order wire communications electrical signal to one of the plurality of outgoing IP packet buffers 53, where they are formatted and queued for one of the plurality of electrical-to-optical converters (E/O) 50. The electrical-to-optical converter (E/O) 50 converts the formatted IP packets of the dedicated order wire communications electrical signal from their electrical format into an optical format and then directs a resulting dedicated order wire communications optical signal 76 to the plurality of multiplexers 46 for possible combining with other optical signals for transmission over respective ones of the plurality of optical fibers 36. More specifically, the resulting dedicated order wire communications optical signal 76 is directed to the appropriate multiplexer 46 and optical fiber 36 which the IP router 54 has determined would allow the dedicated order wire communications optical signal 76 to reach its destined photonics node 32 in the network 30.

At this point it should be noted that, although FIG. 4 shows a photonics node 32 having only one optical fiber 36 and one corresponding demultiplexer 42 for receiving and demultiplexing regular data transport optical signals 64 and a dedicated order wire communications optical signal 66, it is within the scope of the present invention to have multiple optical fibers 36 and multiple corresponding demultiplexers 42 for receiving and demultiplexing multiple sets of regular data transport optical signals 64 and dedicated order wire communications optical signals 66. These multiple sets optical signals are supported by the plurality of optical-to-electrical converters (O/E) 48, the plurality of incoming IP packet buffers 52, and the plurality of extraction components 56.

Similarly, it should be noted that, although FIG. 4 shows a photonics node 32 having only two multiplexers 46 and two corresponding optical fibers 36 for multiplexing and transmitting regular data transport optical signals 64 and a dedicated order wire communications optical signal 74/76, it is within the scope of the present invention to have multiple multiplexers 46 and corresponding optical fibers 36 for multiplexing and transmitting multiple sets of regular data transport optical signals 64 and dedicated order wire communications optical signals 74/76. These multiple sets of optical signals are supported by the plurality of electrical-to-optical converters (E/O) 50, the plurality of outgoing IP packet buffers 53, and the plurality of packetization components 58.

It should also be noted that FIG. 4 only illustrates the flow of signals in one direction (i.e., from the left to the right of the photonics node 32). A return path in the opposite direction is not shown, but it follows the same principle of operation described above.

At this point it should further be noted that, although FIG. 4 only shows and describes the function of a photonics node 32 with an order wire unit 40 being used in conjunction with an optical switch 44, it is within the scope of the present invention that the order wire unit 40 may be implemented and used in a somewhat similar manner as described above with peripheral nodes 34 and/or other types of network nodes.

Similar to a standard IP network, the present invention allows for each network node equipped with an order wire unit 40 to be allocated a specific IP address so that installation and maintenance personnel may contact each specific network node to establish a communication link therewith. An intermediate network node, or nodes, will forward IP packets of dedicated order wire communications optical signals to the appropriate destination network nodes in accordance with standard IP routing protocols, which adhere to IETF standards. That is, each order wire unit 40 supports routing functions, and the dedicated order wire communications optical network therefore constitutes a private IP optical network.

Each order wire unit 40 supports all communication application functions to facilitate all communication features. That is, each order wire unit 40 has an input adaptation component 62 and the output adaptation component 62 for performing adaptation functions to convert specific applications into IP packets, and vice versa. This enables installation and maintenance personnel at any network node to receive/transmit information in voice, data, and/or video formats to any other network node. For example, a voice-over-IP (VoIP) feature will enable installation and maintenance personnel to establish voice communications between all the network nodes. This is in line with the common practice of supporting voice communications in a network. In addition to two-way communications, conference call features may also be established, if desired. Furthermore, a data feature will enable installation and maintenance personnel to exchange data files pertaining to the installation/maintenance of network nodes, for example. Additionally, a video feature will enable installation and maintenance personnel to exchange views of defective components of a network node, for example. These three voice/data/video features will facilitate the installation and maintenance activities of optical networks.

Figure 5:
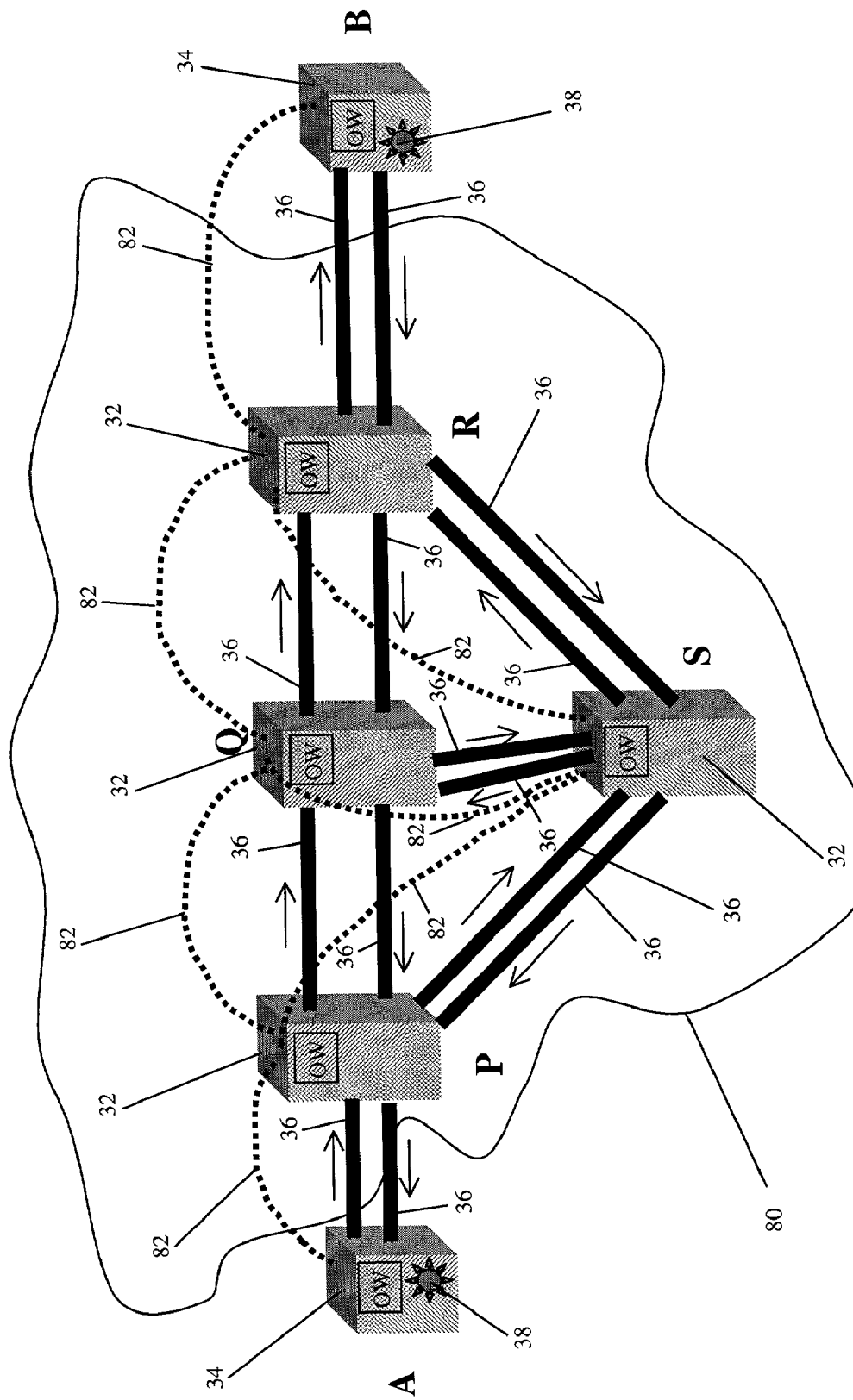
FIG. 5 shows an alternative photonics network having a plurality of photonics nodes with order wire units in accordance with the present invention.

At this point it should be noted that, although FIG. 3 only shows dedicated order wire communications optical signals 66/74/76 being carried on the same optical fibers as the regular data transport optical signals 64, this does not necessarily have to be the case. For example, referring to FIG. 5, there is shown an alternative photonics network 80 in accordance with the present invention. The network 80 shown in FIG. 5 is similar to the network 30 shown in FIG. 3, except that dedicated order wire communications links 82, which may be optical fibers, coaxial cables, or public network connections, interconnect the plurality of photonics nodes (P, Q, R, and S) 32 and the plurality of peripheral nodes (A and B) 34 in the network 80 shown in FIG. 5 (assume that each dedicated order wire communications link 82 is actually two links for bi-directional capability). Thus, the dedicated order wire communications optical signals 66/74/76 may travel on corresponding dedicated order wire communications links 82.

In summary, the present invention dedicated order wire communications optical network can support voice, data, and video communications and can be installed in a mesh or linear network. Its feature set immediately supercedes the single voice only function supported by existing networks. This type of dedicated order wire communications optical network is deemed essential for installation and maintenance personnel servicing the future generation of photonics networks.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for providing inter-nodal communications between network service personnel in a photonics network having a plurality of network nodes each having a unique network address, the method comprising the steps of:

receiving a dedicated inter-nodal communications optical signal and at least one data transport optical signal at a first of the plurality of network nodes, the received dedicated inter-nodal communications optical signal including a destination network address corresponding to a destination network node of the plurality of networks nodes, the destination network address being initially included at an originating network node of the plurality of network nodes for conducting inter-nodal communications from network service personnel physically located at the originating network node to network service personnel physically located at the destination network node;

routing the at least one received data transport optical signal, via an optical switch in the first network node, to another of the plurality of network nodes without converting the at least one received data transport optical signal into an electrical format;

forwarding the received dedicated inter-nodal communications optical signal from the first network node to a second of the plurality of network nodes if the destination network address does not match the unique network address of the first network node, the forwarding of the received dedicated inter-nodal communications optical signal being determined based upon a corresponding received dedicated inter-nodal communications electrical signal; and processing the received dedicated inter-nodal communications optical signal at the first network node if the destination network address matches the unique network address of the first network node thereby identifying the first network node as the destination network node, the processing of the received dedicated inter-nodal communications optical signal being determined based upon the corresponding received dedicated inter-nodal communications electrical signal, the processing of the received dedicated inter-nodal communications optical signal including extracting any one of audio, video, and data information from the received dedicated inter-nodal communications optical signal for conducting inter-nodal communications from network service personnel physically located at the originating network node to network service personnel physically located at the destination network node.

2. The method as defined in claim 1, wherein the step of receiving a dedicated inter-nodal communications optical signal at a first of the plurality of network nodes includes the step of:

demultiplexing a multiplexed optical signal including the dedicated inter-nodal communications optical signal and the at least one data transport optical signal.

3. The method as defined in claim 1, further comprising the step of:

converting the received dedicated inter-nodal communications optical signal into the received dedicated inter-nodal communications electrical signal.

4. The method as defined in claim 3, further comprising the step of:

directing the received dedicated inter-nodal communications electrical signal into at least one incoming IP packet buffer.

5. The method as defined in claim 4, wherein the destination network address is an IP destination network address, wherein the step of forwarding the received dedicated inter-nodal communications optical signal to a second of the plurality of network nodes includes the step of:

routing the received dedicated inter-nodal communications electrical signal based upon the IP destination network address.

6. The method as defined in claim 5, wherein the step of processing the received dedicated inter-nodal communications optical signal at the first network node includes the step of:

formatting the extracted information into one of an audio, video, and data output format.

7. The method as defined in claim 1, further comprising the step of:

receiving any one of audio, video, and data information in an electrical form.

8. The method as defined in claim 7, further comprising the step of:

formatting the received electrical information.

9. The method as defined in claim 8, further comprising the step of:

packetizing the formatted received electrical information into at least one electrical IP packet, each electrical IP packet having a respective IP destination network address.

10. The method as defined in claim 9, further comprising the step of:

routing each electrical IP packet based upon each respective IP destination network address.

11. The method as defined in claim 10, further comprising the step of:

converting each electrical IP packet into a converted dedicated inter-nodal communications optical signal.

12. The method as defined in claim 11, further comprising the step of:

multiplexing the converted dedicated inter-nodal communications optical signal with other optical signals.

13. An apparatus for supporting inter-nodal communications between network service personnel in an optical network having a plurality of network nodes each having a unique network address, the apparatus comprising:

an optical switch in a first of the plurality of network nodes for routing at least one data transport optical signal received at the first network node to another of the plurality of network nodes without converting the at least one received data transport optical signal into an electrical format;

an optical-to-electrical converter in the first network node for converting a dedicated inter-nodal communications optical signal received at the first network node into a received converted dedicated inter-nodal communications electrical signal, the received converted dedicated inter-nodal communications electrical signal including a destination network address corresponding to a destination network node of the plurality of networks nodes, the destination network address being initially included at an originating network node of the plurality of network nodes for conducting inter-nodal communications from network service personnel physically located at the originating network node to network service personnel physically located at the destination network node;

an electrical router in the first network node for routing the received converted dedicated inter-nodal communications electrical signal based upon the destination network address;

an extraction unit in the first network node for extracting any one of audio, video, and data information from the received converted dedicated inter-nodal communications electrical signal if the electrical router routes the received converted dedicated inter-nodal communications electrical signal to the extraction unit for processing in the first network node thereby identifying the first network node as the destination network node, the extracted information for conducting inter-nodal communications from network service personnel physically located at the originating network node to network service personnel physically located at the destination network node; and an electrical-to-optical converter in the first network node for converting the received converted dedicated inter-nodal communications electrical signal into a forwarded dedicated inter-nodal communications optical signal if the electrical router routes the received converted dedicated inter-nodal communications electrical signal to the electrical-to-optical converter for forwarding the received converted dedicated inter-nodal communications electrical signal to another of the plurality of network nodes.

14. The apparatus as defined in claim 13, further comprising:
a demultiplexer for demultiplexing a multiplexed optical signals including the received dedicated inter-nodal communications optical signal and the at least one received data transport optical signal.

15. The apparatus as defined in claim 13, further comprising:
an output adaptation unit for formatting the extracted information into one of an audio, video, and data output format.

16. The apparatus as defined in claim 13, further comprising:
an input adaptation unit for receiving any one of audio, video, and data information in an electrical form.

17. The apparatus as defined in claim 16, further comprising:
a packetization unit for packetizing the received electrical information into at least one packetized electrical signal, each packetized electrical signal having a respective IP destination network address.

18. The apparatus as defined in claim 17, wherein the electrical router routes each packetized electrical signal based upon each respective IP destination network address.

19. The apparatus as defined in claim 18, further comprising:
a plurality of IP packet buffers for storing each packetized electrical signal and the received converted dedicated inter-nodal communications electrical signal.

20. The apparatus as defined in claim 13, further comprising:
a multiplexer for multiplexing the forwarded dedicated inter-nodal communications optical signal with other optical signals.

* * * * *